(12) United States Patent
Li

(10) Patent No.: US 9,058,100 B2
(45) Date of Patent: Jun. 16, 2015

(54) USING MOTION GESTURES TO SEND, SAVE, DELETE, AND REJECT A MESSAGE

(71) Applicant: Fang Li, San Jose, CA (US)

(72) Inventor: Fang Li, San Jose, CA (US)

(*) Notice: Subject to any disclaimer, the term of this patent is extended or adjusted under 35 U.S.C. 154(b) by 190 days.

(21) Appl. No.: 13/670,428

(22) Filed: Nov. 6, 2012

(65) Prior Publication Data

US 2014/0125593 A1    May 8, 2014

(51) Int. Cl.
*G06F 3/0481* (2013.01)
*G06F 3/0488* (2013.01)

(52) U.S. Cl.
CPC .................................. *G06F 3/04883* (2013.01)

(58) Field of Classification Search
CPC .................................................. G06F 3/04883
USPC .................................................. 715/238, 247
See application file for complete search history.

(56) References Cited

U.S. PATENT DOCUMENTS

| 2008/0036743 | A1* | 2/2008 | Westerman et al. | 345/173 |
| 2012/0007890 | A1* | 1/2012 | Choi et al. | 345/635 |
| 2013/0311947 | A1* | 11/2013 | Tsai et al. | 715/815 |
| 2013/0332856 | A1* | 12/2013 | Sanders et al. | 715/753 |
| 2014/0043209 | A1* | 2/2014 | Walker et al. | 345/1.2 |

* cited by examiner

*Primary Examiner* — Scott Baderman
*Assistant Examiner* — Hassan Mrabi
(74) *Attorney, Agent, or Firm* — Patent Law Group LLP; David C. Hsia

(57) ABSTRACT

A method for providing a user interface includes creating a representative image of a media content, displaying the representative image on a screen, making the representative image a movable object on the screen, monitoring a motion gesture to move the representative image, and performing a corresponding action based on the motion gesture. The action includes saving, deleting, sending, or rejecting a message including the representative image and the media content or a link to the media content.

11 Claims, 5 Drawing Sheets

USING MOTION GESTURES TO SEND, SAVE, DELETE, AND REJECT A MESSAGE

BACKGROUND

Computing devices may have user interfaces that utilize gestures. A gesture may be received through a human-machine interface, including but limited to a touchpad or a touchscreen, and interpreted by a controller or processor.

BRIEF DESCRIPTION OF THE DRAWINGS

In the drawings.

Use of the same reference numbers in different figures indicates similar or identical elements.

DETAILED DESCRIPTION OF THE INVENTION

The typical way a user interacts with a media content is to select the media content and click an action button from a menu. The present disclosure provides an improved way for a user to interact with a media content that is natural and intuitive.

In examples of the present disclosure, an image that represents a media content is made a movable object. The media content may be a photo, a video clip, a webpage, a map on a webpage (hereafter "web map"), an audio clip, a text document, or another type of media content. Motion gestures are used to move the representative image to trigger corresponding actions. For example, the motion gestures move the representative image beyond designated boundaries to trigger the corresponding actions. Alternatively the motion gestures in designated directions trigger the corresponding actions. The actions performed in response to the motion gestures include sending, saving, deleting, and rejecting a message including the representative image. The message may further include the media content itself or a link to the media content on cloud storage or a webpage on the Internet.

Figure 1:
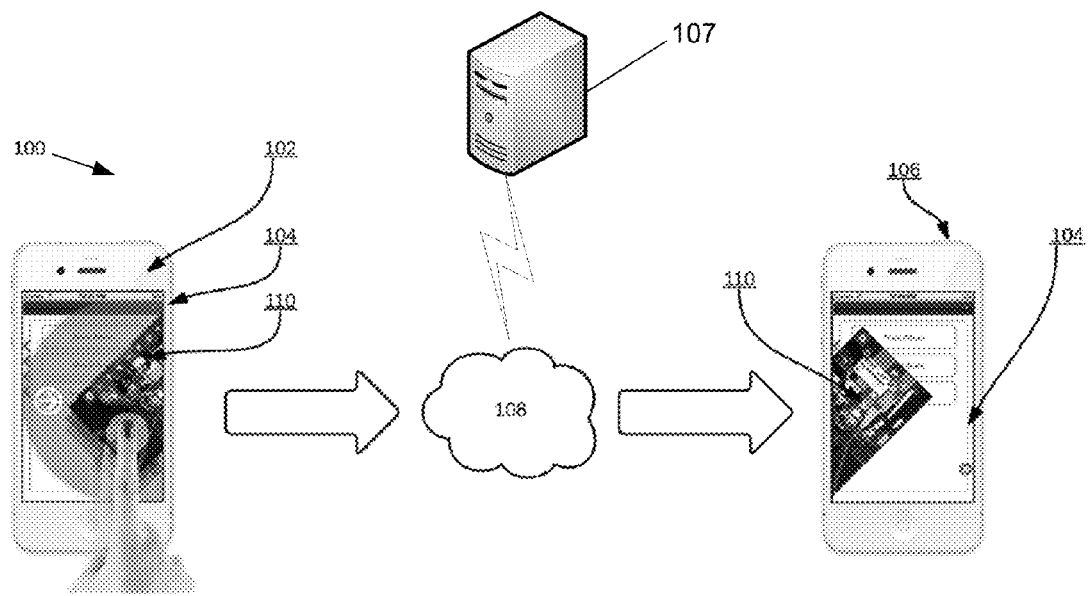
FIG. 1 shows a system for sending a message in one example of the present disclosure.

FIG. 1 shows a system 100 for sending a message in one example of the present disclosure. System 100 includes a computing device 102 having a software application 104 and a computing device 106 having the same software application 104. Running software application 104, computing devices 102 and 106 can log onto a media sharing server 107 via a network 108. Server 107 relays messages between computing devices 102 and 106. Alternatively computing devices 102 and 106 may communicate messages directly via network 108. Computing devices 102 and 106 are smart phones or tablet computers. Alternatively computing devices 102 and 106 may be laptop computers, desktop computers, gaming consoles, set-top boxes, or other similar devices. Software application 104 is a media sharing application that allows a user to create, edit, save, delete, send, receive, and reject a message 110 for sharing a media content. Alternatively software application 104 may be an instant messaging application, an image chatting application, a crowd computing application, or another similar software application. Network 108 includes any local and wide area networks, such as the Internet, that are needed to connect computing devices 102 and 106.

Message 110 includes a representative image of the media content. Message 110 may further include the media content itself or a link to the media content on cloud storage or a webpage on the Internet. The media content may be a photo, a video clip, a webpage, and a location on a web map (e.g., a Google map), an audio clip (e.g., a voice recording), a text document, or a combination thereof. For a photo, the representative image may be a smaller resolution version of the photo. For a video clip, the representative image may be a frame captured from the video clip. For a webpage, including a map on a webpage, the representative image may be a screenshot of the webpage. An audio clip may not have a representative image but it may be part of a message with another media content that has a representative image. For a text document, the representative image may be a photo of the text document.

Figure 2:
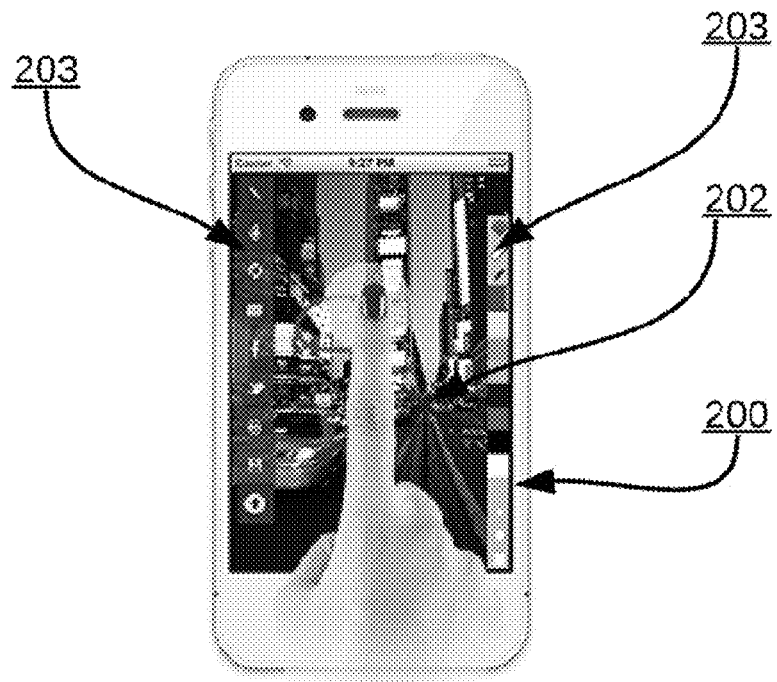
FIG. 2 shows a screen of a media sharing application for creating a message in one example of the present disclosure.

FIG. 2 shows a screen 200 of media sharing application 104 (FIG. 1) on a sender device (e.g., computing device 102 in FIG. 1) in one example of the present disclosure. To use application 104, a user initially provides her email address and password, which are used to create a new user account. To create a new message 110, the user selects a recipient and a media content. The user selects a recipient by entering an email address, search for an existing user of application 104 by name, or picking an existing user of application 104 from a contact list. Once a recipient is selected, a session is established between sender device 102 and the recipient devices (e.g., computing device 106 in FIG. 1) via the media sharing server (e.g., server 107 in FIG. 1).

The user may select an existing media content or capture a new media content on-the-fly using the hardware of sender device 102. For example, the user may select an existing photo or video clip in the user's library on sender device 102 or captures a new photo or video clip in real-time using the camera on the sender device. In another example, the user captures a webpage or a location on a web map in real-time using the Internet browser on sender device 102. In another example, the user may select an existing audio clip or captures a new sound clip in real-time using the microphone on sender device 102. In another example, the user may capture a photo of a text document using the camera on sender device 102.

Application 104 creates a representative image 202 of the media content. The resolution of the representative image may be based on the bandwidth available to the computing device. For example, representative image 202 may be 800 by 600 pixels for 4G and WiFi and 480 by 320 pixels for 3G or less.

The user may activate one or more menus 203 to edit representative 202. For example, the user may add comments or draw on representative image 202. Depending on the operating system on the computing device, the edits to representative image 202 may be saved as a layer atop the representative image or as part of the representative image.

For the representative image of a photo, application 104 creates a base64 version of the photo (i.e., converting the binary data to an ASCII string). Message 110 includes both the representative image and the photo for sharing the photo with another user.

For the representative image of a video clip, application 104 captures a frame of the video clip (e.g., the first frame) and converts it to a base64 image. Application 104 also uploads the video clip to cloud storage for sharing and records a link to the video clip. Message 110 includes the representative image and the link for sharing the video with another user.

For the representative image of a webpage, application 104 captures a screenshot of the webpage and converts it to a base64 image. Message 110 includes both the screenshot of the webpage and the URL of the webpage for sharing the webpage with another user.

For the representative image of a location on a web map, application 104 captures a screenshot of the web map and converts it to a base64 image. Application 104 also records the URL to the web map, which includes location information used by the website to generate the web map. Message 110 includes both the screenshot of the web map and the URL of the web map for sharing the location on the web map with another user.

For an audio clip, application 104 uploads the audio clip to cloud storage for sharing and records a link to the sound clip. Message 110 includes the link for sharing the sound clip with another user.

For a text document, application 104 captures a photo of the text document, performs optical character recognition (OCR), creates a text file based on the OCR result, and creates a base 64 version of the photo as the representative image. Message 110 includes both the representative image and the text file for sharing the text document with another user.

In some examples, sender device 102 preemptively sends message 110 in the background by first sending representative image 202 and optionally the media content to server 107 before the user actually selects to send the message. Server 107 then relays representative image 202 and optionally the media content to recipient device 106 in the background. When the user selects to send message 110, sender device 102 then sends any edits as a layer for representative image 202 to recipient device 106.

Application 104 makes representative image 202 an object that can be moved by motion gestures up, down, left, right, or a combination thereof. Application 104 monitors the motion gesture and performs action corresponding to the motion gesture. In one example, when a user taps, presses, or uses another similar gesture to select representative image 202, application 104 rotates the representative image at an angle to indicate to the user that she is moving the representative image. For example, application 104 rotates representative image 202 clockwise by 45 degrees. In one example, application 104 sets up four boundaries 302, 402, 502, and 702 (FIGS. 3, 4, 5, and 7 respectively) on screen 200. When application 104 detects that representative image 202 has moved beyond one of the boundaries 302, 402, 502, and 702, the application performs one of four corresponding actions. Although boundaries 302, 402, 502, and 702 are shown to be linear, they may be non-linear. For example, they may convex toward the center of the screen.

Figure 3:
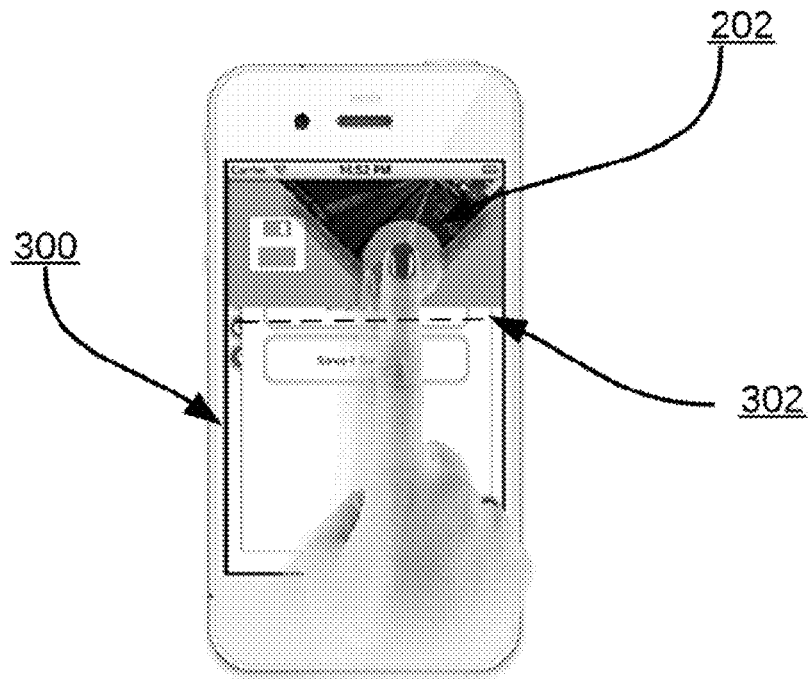
FIG. 3 is a screen illustrating a motion gesture that moves a representative image up beyond a top boundary in one example of the present disclosure.

FIG. 3 is a screen 300 illustrating a motion gesture that moves representative image 202 up beyond a top boundary 302 and then releases the representative image (e.g., lifting off the mouse button or touchscreen) in one example of the present disclosure. In response, application 104 (FIG. 1) saves the message of the current session so it can be opened later in a different session. A user flicks, swipes, drags, or uses another similar gesture to move representative image 202. In one example, a visual hint is provided for the saving action when representative image 202 is moved beyond top boundary 302, such as an image of a floppy disk or another easily recognizable symbol.

Figure 4:
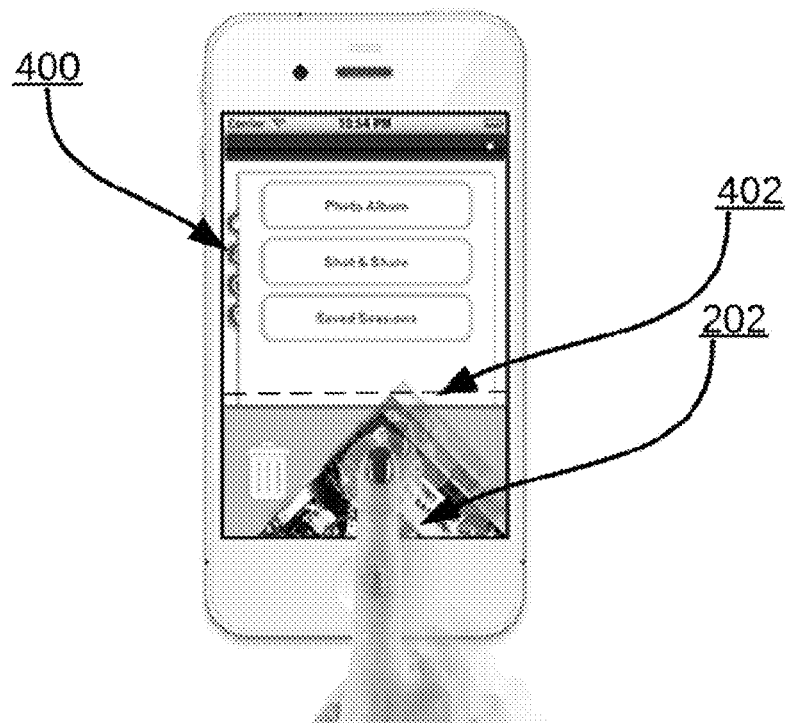
FIG. 4 is a screen illustrating a motion gesture that moves the representative image down beyond a bottom boundary in one example of the present disclosure.

FIG. 4 is a screen 400 illustrating a motion gesture that moves representative image 202 down beyond a bottom boundary 402 and then releases the representative image in one example of the present disclosure. In response, application 104 (FIG. 1) deletes the message from the current session. In one example, a visual hint is provided for the deleting action when representative image 202 is moved beyond bottom boundary 402, such as an image of a trash can or another easily recognizable symbol.

Figure 5:
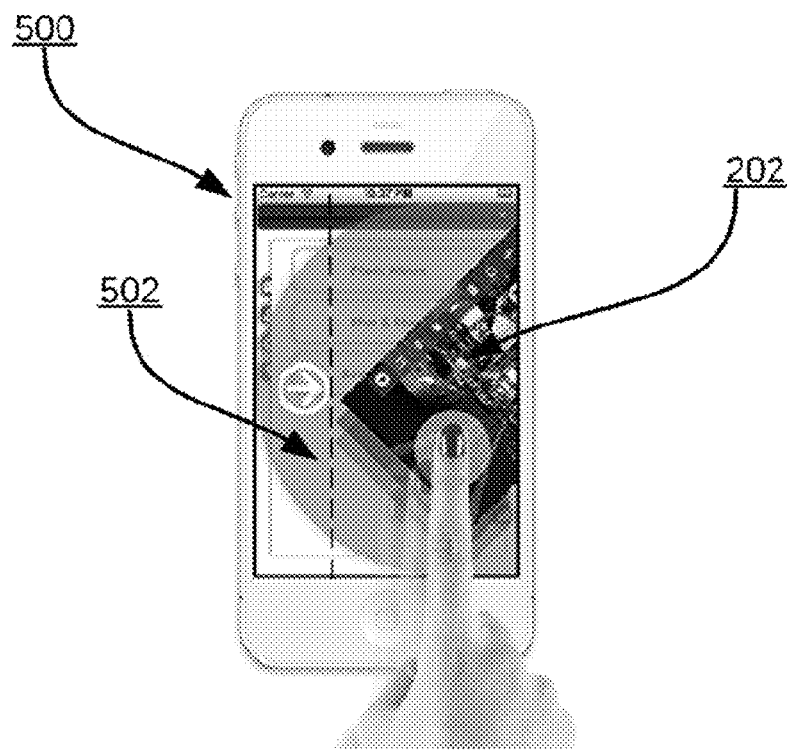
FIG. 5 is a screen illustrating a motion gesture that moves the representative image to the right beyond a right boundary in one example of the present disclosure.

FIG. 5 is a screen 500 illustrating a motion gesture that moves representative image 202 to the right beyond a right boundary 502 and then releases the representative image in one example of the present disclosure. In response, application 104 (FIG. 1) sends the message to the selected recipient of the current session. In one example, a visual hint is provided for the sending action when representative image 202 is moved beyond right boundary 502, such as an image of an arrow sign or another easily recognizable symbol.

In one example, application 104 records the amount of representative image 202 that extends beyond screen 200 and sends that information over along with the message. This information may be a percentage or actual coordinates of representative image 202, and it is used to reproduce the same amount of representative image 202 that extends into screen 200 of the recipient device. This is one example in which the sender environment is reproduced at the recipient environment to provide consistency across different environments on the sender and the recipient devices.

Figure 6:
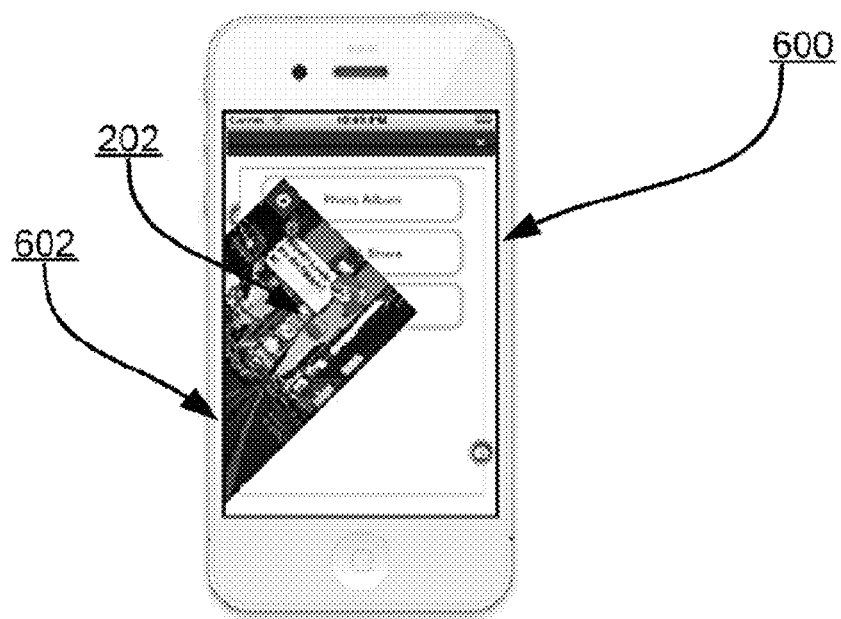
FIG. 6 is a screen illustrating the receipt of a new message having the representative image in one example of the present disclosure.

FIG. 6 is a screen 600 illustrating the receipt of a new message having representative image 202 on recipient device 106 (FIG. 1) in one example of the present disclosure. Representative image 202 may be rotated at an angle and extended from a side 602 of the screen to indicate to the user that she has received a new message. For example, application 104 (FIG. 1) rotates representative image 202 clockwise by 45 degrees and extends the representative image from the left edge 602 of the screen. As described above, the message includes information about the amount of representative image 202 that extends out of screen 200 of the sender device, which application 104 uses to generate a representative image 202 that extends in the same amount into screen 200 of the recipient device matches. The user may move representative image 202 to the center of the screen and in response the representative image is reoriented to remove the rotation.

Figure 7:
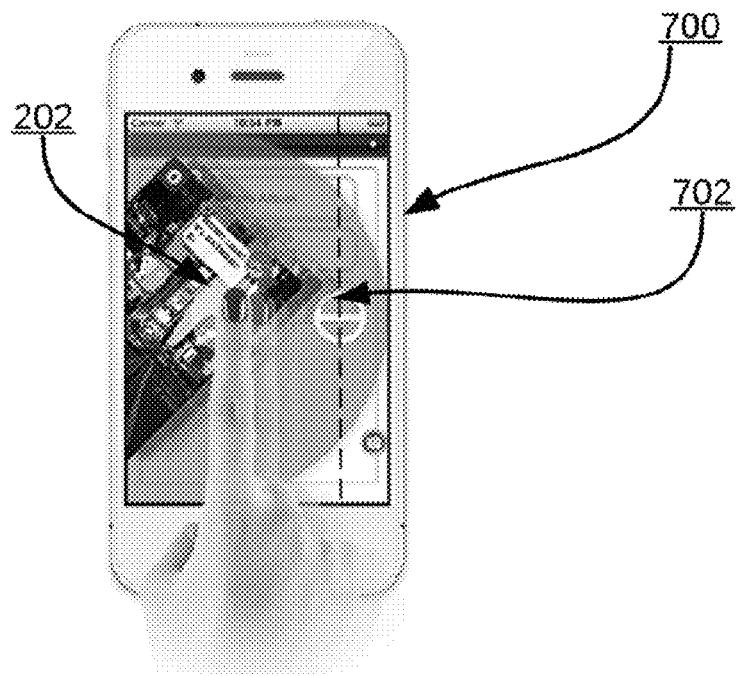
FIG. 7 is a screen illustrating a motion gesture that moves the representative image to the left beyond a left boundary in one example of the present disclosure.

FIG. 7 is a screen 700 illustrating a motion gesture that moves representative image 202 to the left beyond a left boundary 702 and then releases the representative image in one example of the present disclosure. In response, application 104 (FIG. 1) rejects the message and terminate the current session between recipient device 106 (FIG. 1) and sender device 102 (FIG. 1). In one example, a visual hint is provided for the rejecting action when representative image 202 is moved beyond left boundary 702, such as an image of a rejection sign or another easily recognizable symbol.

When the message is rejected, it reappears on sender device 102 to indicate to the sender that the message has been rejected. To send a message to the receiver again, the sender has to reestablish a session between sender device 102 and recipient device 106.

In one example of the present disclosure, application 104 performs an action based on the direction of the motion gesture. For example, when the motion gesture moves representative image 202 in an upward direction as shown in FIG. 3, application 104 (FIG. 1) saves the message. When the motion gesture moves representative image 202 in a downward direction as shown in FIG. 4, application 104 deletes the message. When the motion gesture moves representative image 202 in a rightward direction as shown in FIG. 5, application 104 sends the message. When the motion gesture moves representative image 202 in a leftward direction as shown in FIG. 7, application 104 rejects the message.

Figure 8:
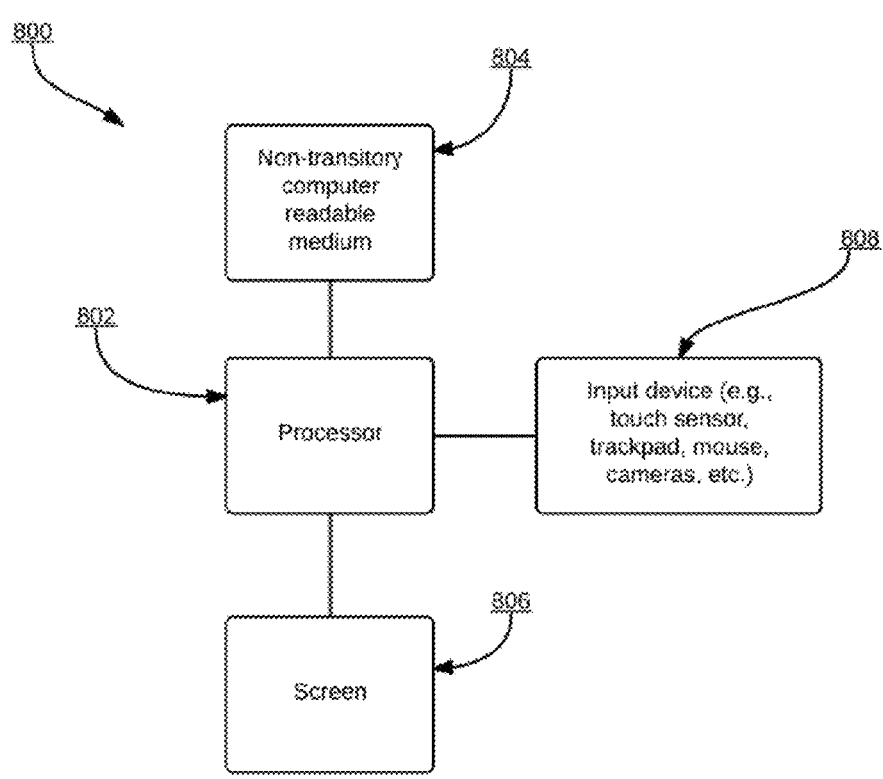
FIG. 8 is a block diagram of a computing device for implementing the media sharing application in one example of the present disclosure.

FIG. 8 is a block diagram of a computing device 800 for implementing application 104 (FIG. 1) in one example of the present disclosure. Computing device 800 includes a processor 802 that executes instructions 804 stored in a non-transitory computer-readable medium, such as a hard disk drive or a solid state drive. Computer executable instructions 804 implement application 104 including its user interface for saving, deleting, sending, and rejecting messages. Processor 802 provides the user interface for application 104 on a display 806. Processor 802 captures user input through an input device 808 and decodes the user input as a gesture. In one example, input device 808 is a touch sensor that forms part of a touchscreen or a touchpad.

Figure 9:
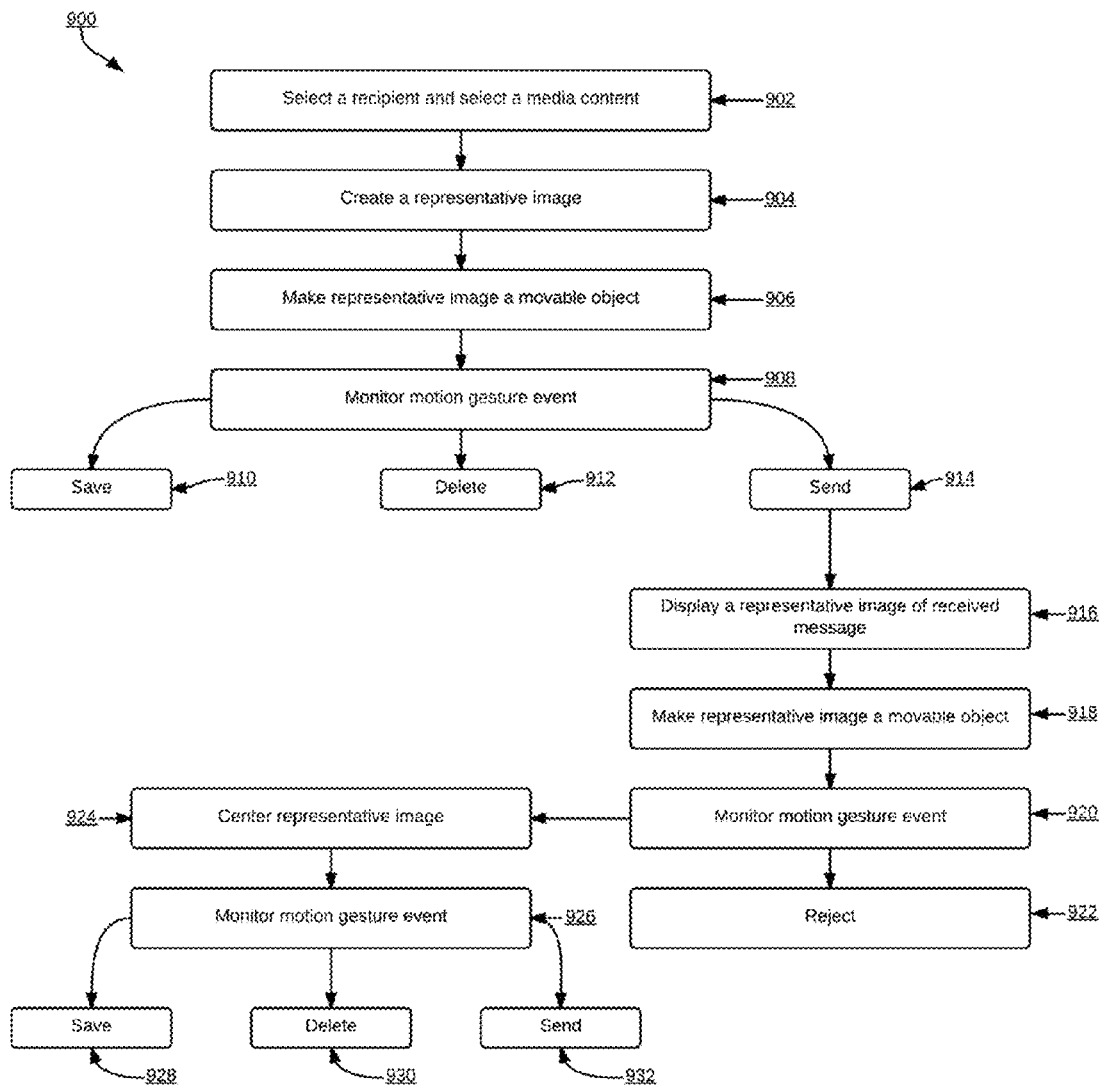
FIG. 9 is a flowchart of a method to implement the media sharing application in one or more examples of the present disclosure.

FIG. 9 is a flowchart of a method 900 to implement application 104 in one or more examples of the present disclosure. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 900 may begin in block 902.

Blocks 902 to 914 represent the actions at sender device 102 (FIG. 1). In block 902, processor 802 (FIG. 8) of sender device 102 allows the user to select a recipient and a media content. Block 902 may be followed by block 904.

In block 904, processor 802 creates a representative image of the media content. Block 904 may be followed by block 906.

In block 906, processor 802 makes the representative image a movable object. Block 906 may be followed by block 908.

In block 908, processor 802 monitors for a motion gesture that moves the representative image. As described above, the representative image may be rotated at an angle to indicate to the user that she is moving the object. Block 908 may be followed by block 910, 912, or 914 depending on the motion gesture detected.

In block 910 when the representative image is moved in a first manner, processor 802 performs a first action. For example, the representative image is moved upward beyond a top boundary or in an upward direction and in response processor 802 saves the message. Block 910 may loop back to block 908.

In block 912 when the representative image is moved in a second manner, processor 802 performs a second action. For example, the representative image is moved downward beyond a lower boundary or in a downward direction and in response processor 802 deletes the message. Block 912 may loop back to block 908.

In block 914 when the representative image is moved in a third manner, processor 802 performs a third action. For example, the representative image is moved to the right beyond a right boundary or in a rightward direction and in response processor 802 sends the message. Block 914 may loop back to block 908.

Blocks 916 to 928 illustrate the actions at recipient device 106 (FIG. 1). In block 916, processor 802 of recipient device 106 displays a new message received from the user on sender device 102. As described above, the representative image of the message may be rotated at an angle and extended from the left edge to indicate that it is a newly received message. Block 916 may be followed by block 918.

In block 918, processor 802 makes the representative image a movable object. Block 918 may be followed by block 920.

In block 920, processor 802 monitors for a motion gesture that moves the representative image. Block 920 may be followed by block 922 or 924 depending on the motion gesture.

In block 922 when the representative image is moved in a fourth manner, processor 802 performs a fourth action. For example, the representative image is moved to the left beyond a left boundary or in a leftward direction and in response processor 802 rejects the message.

In block 924, when the representative image is moved in a fifth manner, processor 802 allows the user to perform further actions. For example, the representative image is moved to the center of the screen and in response processor 802 removes the rotation in the representative image. Block 924 may be followed by block 926.

In block 926, processor 802 monitors for any motion gestures that moves the representative image. As described above, the representative image of the message may be rotated at an angle to indicate to the user that she is moving the representative image. Block 926 may be followed by block 928, 930, or 932 depending on the motion gesture.

In block 928 when the representative image is moved in the first manner, processor 802 performs the first action. For example, the representative image is moved upward beyond the top boundary or in the upward direction and in response processor 802 saves the message. Block 928 may loop back to block 926.

In block 930 when the representative image is moved in the second manner, processor 802 performs the second action. For example, the representative image is moved downward beyond the lower boundary or in the downward direction and in response processor 802 deletes the message. Block 930 may loop back to block 926.

In block 932 when the representative image is moved in the third manner, processor 802 performs the third action. For example, the representative image is moved to the right beyond the right boundary or in a rightward direction and in response processor 802 sends the message. Block 932 may loop back to block 926.

Various other adaptations and combinations of features of the embodiments disclosed are within the scope of the invention. Numerous embodiments are encompassed by the following claims.

The invention claimed is:

1. A method for providing a user interface, comprising:
creating a representative image of a media content;
making the representative image a movable object on a screen;
monitoring a motion gesture that moves the representative image;
and when the motion gesture moves the representative image partially off the screen so a remaining portion of the representative image is beyond a boundary on the screen, performing a corresponding action;

wherein the action is saving a message, deleting the message, or sending the message over a network to a recipient, the message including the representative image and the media content or a link to the media content;

when the representative image is selected, rotating the representative image at an angle to indicate the representative image is being moved;

when the motion gesture moves the remaining portion of the representative image beyond a first boundary on the screen, saving the message;

when the motion gesture moves the remaining portion of the representative image beyond a second boundary on the screen, deleting the message; and when the motion gesture moves the remaining portion of the representative image beyond a third boundary, sending the message.

2. The method of claim 1, wherein the first boundary is a top boundary, the second boundary is a bottom boundary, and the third boundary is a right boundary.

3. The method of claim 2, further comprising:
receiving another message including another representative image and another media content or another link to the other media content;
displaying the other representative image partially on the screen;
making the other representative image another movable object on the screen;
monitoring another motion gesture that moves the other representative image; and
when the other motion gesture moves the other representative image further off the screen so another remaining portion of the other representative image is beyond another boundary on the screen, rejecting the other message.

4. The method of claim 3, wherein displaying the other representative image comprises rotating the other representative image at the angle to indicate the representative image is being moved.

5. The method of claim 4, wherein the another boundary is a left boundary.

6. The method of claim 1, further comprising:
receiving a selection of the recipient;
receiving a selection of the media content; and
receiving edits to the representative image.

7. The method of claim 6, wherein receiving edits to the representative image comprises receiving one or more of comments and markups to the representative image.

8. The method of claim 1, wherein the media content comprises a photo, a video clip, a webpage, and a location on a web map, a sound clip, or a text document.

9. The method of claim 1 comprising:
determining information about a portion of the representative image that extends beyond the screen, the message including the information.

10. The method of claim 1, further comprising:
receiving another message including another representative image, another media content or another link to the other media content, and information about a portion of the other representative image;
displaying the other representative image rotated at the angle and partially on the screen so the portion is visible on the screen;
making the other representative image another movable object on the screen;
monitoring another motion gesture that moves the other representative image;
when the other motion gesture moves the other representative image further off the screen so another remaining portion of the other representative image is beyond another boundary on the screen, rejecting the other message; and
when the other motion gesture moves the other representative to a center of the screen, removing a rotation of the other representative image.

11. A method for a first device to communicate with a second device over a network, comprising:
displaying a representative image of a media content on a screen;
making the representative image a movable object on the screen;
monitoring a motion gesture that moves the representative image;
and when the motion gesture moves the representative image partially off the screen so a remaining portion of the representative image is beyond a boundary on the screen, performing a corresponding action;
wherein the action is saving a message, deleting the message, or sending the message over a network to a recipient, the message including the representative image and the media content or a link to the media content;
when the representative image is selected, rotating the representative image at an angle to indicate the representative image is being moved;
when the motion gesture moves the remaining portion of the representative image beyond a first boundary on the screen, saving the message;
when the motion gesture moves the remaining portion of the representative image beyond a second boundary on the screen, deleting the message; and
when the motion gesture moves the remaining portion of the representative image beyond a third boundary, sending the message;
when the message is rejected by the second device, redisplaying the representative image to indicate the message has been rejected.

* * * * *